United States Patent [19]
Murphy

[11] 3,787,742
[45] Jan. 22, 1974

[54] ELECTRIC SHEARS

[75] Inventor: Timothy C. Murphy, Columbus, Ind.

[73] Assignee: Arvin Industries, Inc., Columbus, Ind.

[22] Filed: Mar. 7, 1972

[21] Appl. No.: 232,446

[52] U.S. Cl. ..................... 310/50, 30/228, 200/157
[51] Int. Cl. .............................................. H02k 7/14
[58] Field of Search... 30/228; 200/157; 310/47, 50, 310/80; 318/346, 443, 466

[56] References Cited
UNITED STATES PATENTS

| | | | |
|---|---|---|---|
| 2,740,197 | 4/1956 | Padva | 30/228 |
| 3,408,875 | 11/1968 | Briskman et al. | 30/228 X |
| 3,478,426 | 11/1969 | Greene | 30/228 |
| 3,536,976 | 10/1970 | Briskman et al. | 30/228 X |
| 3,583,067 | 6/1971 | Briskman et al. | 30/228 |
| 3,602,988 | 9/1971 | Little | 30/228 |
| 3,693,254 | 9/1972 | Salonen | 30/228 |

*Primary Examiner*—William M. Shoop, Jr.
*Attorney, Agent, or Firm*—Thomas P. Jenkins et al.

[57] ABSTRACT

An electric shears in which there is provided a housing having swingably interconnected first and second cutting blades mounted therein and projecting outwardly therefrom. A gear train is mounted within the housing and is interconnected between a reversable electric motor and said second blade for moving said second blade with respect to said first blade. A manually manipulatable switch assembly is mounted on said housing and is coupled through a second switch assembly for actuating said motor to drive said gear train in a first direction to cause the cutting blades to open and close. A cam driven by the gear train is engageable with said second switch assembly for selectively opening and closing said assembly to control said motor to drive said gear train in a second direction for an interval sufficient to position the cutting blades in an open position and deactuate said motor.

19 Claims, 10 Drawing Figures

PATENTED JAN 22 1974 3,787,742

ELECTRIC SHEARS

BACKGROUND OF THE INVENTION

The use of electric scissors is well known in the art. Such scissors normally employ a fixed blade in combination with a movable blade in which the movable blade is driven through its cutting strokes by an electric motor. The blades are short and the cutting strokes are short but extremely rapid. The mechanism for effecting this type of cutting action is relatively small and can be easily mounted in a compact housing to facilitate manipulation of the scissors.

Other types of cutting shears, for example, pinking shears, have different requirements. Normally, such shears employ heavy long blades. Their cutting strokes are substantially longer than those employed in conventional electric scissors, and such strokes proceed at a much slower rate. Further, the power requirements necessary for such cutting strokes are substantially greater than with conventional electric scissors. Because of the greater mass and the jagged cutting edges of pinking shears, it is desirable to incorporate into such shears safety features which are not necessary in conventional electric scissors.

It is therefore an object of this invention to provide an electric shears which will provide long but relatively slow cutting strokes, which will be safe and easy to handle, and which will be of a compact size.

SUMMARY OF THE INVENTION

In accordance with one form of the invention, as it is embodied in a pair of pinking shears, there is provided a housing having a reversable electric motor mounted therein. The motor is connected to a rectifier and transformer for connection to a conventional electric outlet. The motor is also connected to a gear train carried in a casing mounted within the housing and provided with an output drive gear.

Two pairs of vertically spaced mounts project from one end of the casing. A shaft is rotatably carried in one pair of said mounts, and a driven bevel gear is mounted on said shaft in mesh with the drive gear. A stud eccentrically mounted on the driven gear projects outwardly therefrom and is slidably received in an elongated slot formed in the inner end of a movable cutting blade. The cutting blade projects outwardly from the housing with its cutting edge disposed in operative engagement with the outwardly projecting cutting edge of a fixed blade having its inner end fixedly connected to the gear train casing. The blades are swingably interconnected so that upon rotation of the driven gear its stud reciprocating in the cutting blade slot will cause the cutting edges of the blades to achieve the desired cutting action.

A switch and contact assembly is mounted on the upper pair of mounts on the gear train casing. Said assembly comprises first and third contacts wired in series and connected to one side of said rectifier and second and fourth contacts wired in series and connected to the opposite side of said rectifier. A pair of switch arms are swingably supported from the upper pair of gear train casing mounts. Each switch arm is interconnected to a switch blade, said blades having fifth and sixth contacts. Movement of the switch arms to effect movement of their respective switch blades is controlled alternatively by a manually manipulatable switch mounted on the housing and by a cam carried on the shaft for rotation therewith.

In operation, the manual manipulatable switch is closed to move the switch arms out of contact with the cam and thereby cause the fifth and sixth contacts on their switch blades to close against the first and second contacts. This actuates the motor to cause the gear train to move in a forward direction so that the movable blade will reciprocate in a manner to effect a cutting operation. Upon release of the manually manipulatable switch, the switch arms engage the cam to move their blades into a second position in which blade contacts five and six close against the third and fourth contacts. This reverses the polarity of the current to the motor to reverse the directional drive of the gear train and thereby effect a corresponding reversal in the movement of the cutting blade. After the cam has rotated through a partial revolution, however, its cam surfaces will effect a movement of the switch arms such that the switch blade associated with one of said arms will move so that the fifth and sixth contacts will be closed against the first and third contacts to thus deactuate the motor. In this manner, the motor will be deactuated at a point where the movable blade will be in an open position with respect to the fixed blade.

BRIEF DESCRIPTION OF THE DRAWINGS

The accompanying drawings illustrate the invention. In such drawings.

DETAILED DESCRIPTION OF THE PREFERRED EMBODIMENT

Figure 1:
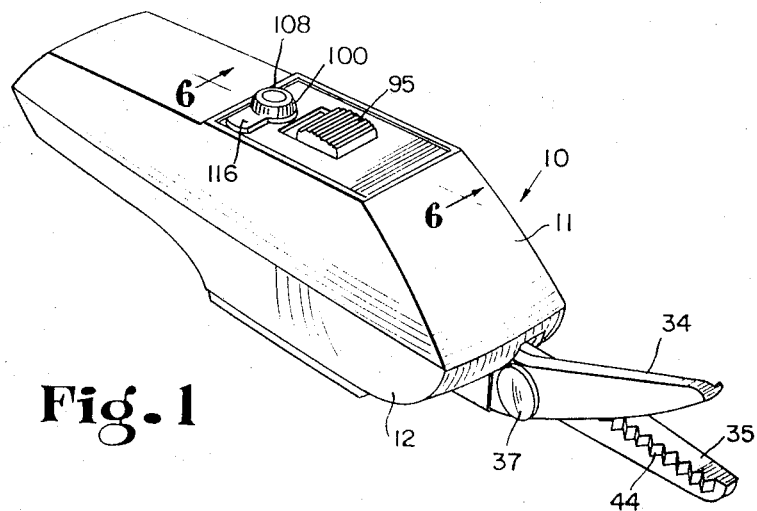
FIG. 1 is a perspective view of an electric shears embodying the invention.
Figure 2:
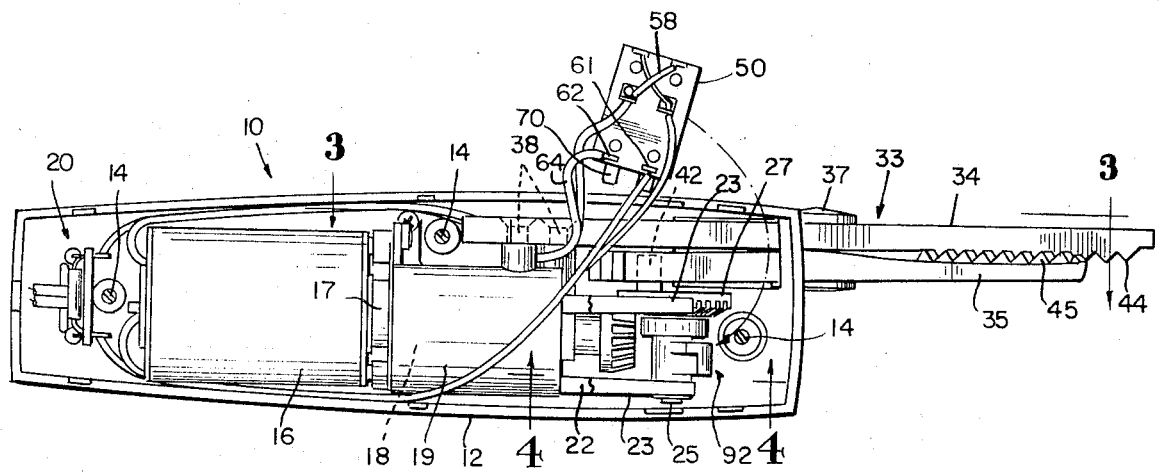
FIG. 2 is a top plan view of the shears shown in FIG. 1, but with the upper shell of the housing removed therefrom.
Figure 3:
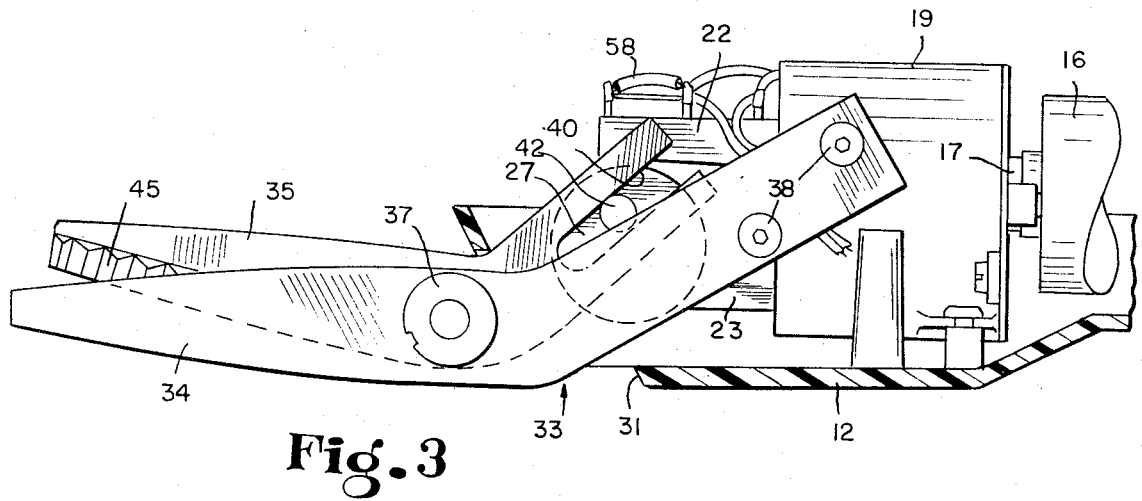
FIG. 3 is an enlarged longitudinal section taken on the line 3—3 of FIG. 2, but showing the blades in their closed cutting position.

The electric shears illustrated in the drawings are provided with a housing 10 conveniently formed from a pair of opposed upper and lower shells 11 and 12 interconnected by a plurality of bolts 14. As shown in FIG. 2, a reversible electric motor 16 is mounted in the shell 12 with its drive shaft 17 connected to a gear train 18 carried in a casing 19 also mounted in shell 12. As will be described more specifically hereinafter, the motor 16 is adapted to be connected to a conventional A-C outlet through a rectifier 20 and step-down transformer 21.

Two pairs of laterally spaced mounts 22 and 23 project outwardly from the forward end of the casing 19 in vertically spaced relationship. A shaft 25 is journaled in the mounts 23 and projects outwardly beyond the lateral extent of said mounts. A bevel driven gear 27 is fixedly mounted on the shaft 25 laterally outwardly from one of the mounts 23. Said gear is in mesh with a bevel output drive gear 29 mounted on the output shaft of gear train 18.

The gear 27 is disposed in driving engagement with the blade assembly 33 projecting outwardly through an opening 31 in shell 12. As shown, said blade assembly comprises an angulated fixed blade 34 and an angulated movable blade 35 swingably interconnected intermediate their ends by a pivot pin 37. The inner end of blade 34 is fixedly connected to the gear train casing 19 by a pair of bolts 38, and the inner end of the movable blade 35 has an elongated slot 40 formed therein. A stud 42 is eccentrically mounted on the gear 27 and is slidably and rotatably received in slot 40. Thus, upon rotation of gear 27, its stud 42 acting upon the slot 40 will cause the blade 35 to swing with respect to the blade 34 so that the cutting edges 44 and 45 on blade 34 and 35 will effect the desired cutting action.

Figure 4:
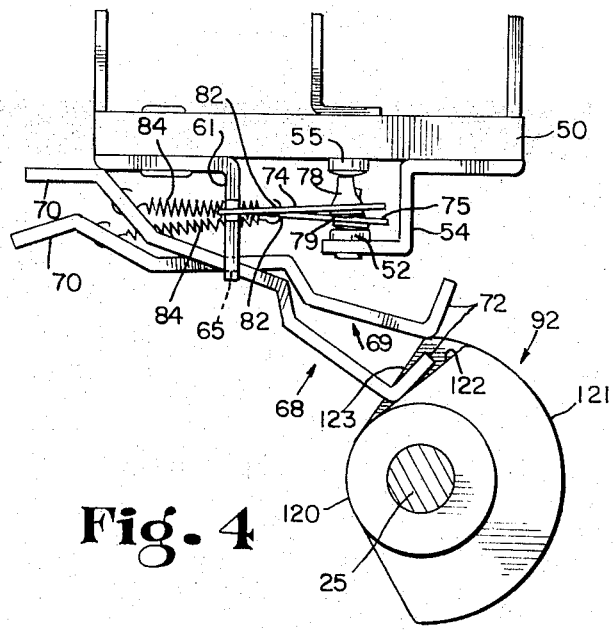
FIG. 4 is an enlarged longitudinal section taken on the line 4—4 of FIG. 2 and showing the switch assembly in its motor-stopped position.
Figure 5A:
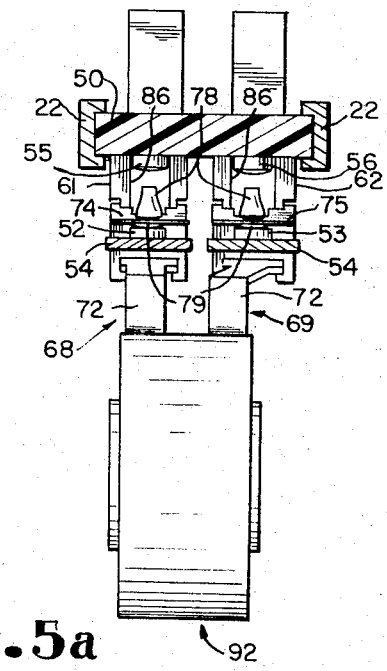
FIG. 5A through C are enlarged transverse sections taken on the line 5—5 of FIG. 4 and showing the switch assembly in positions of adjustment for respectively driving, reversing and stopping the motor.
Figure 5B:
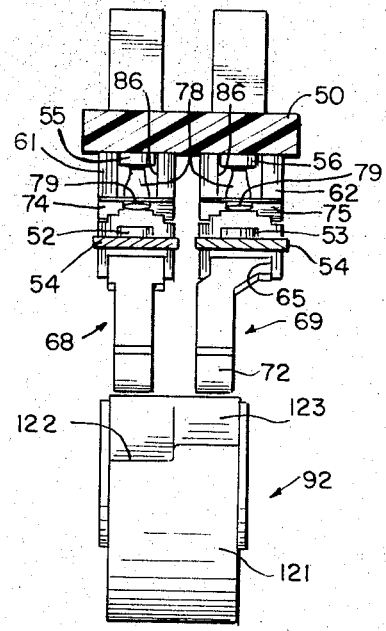
Figure 5C:
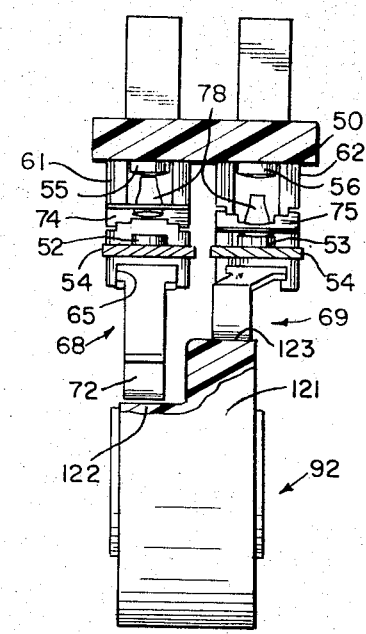

The switch assembly for controlling the directional drive imparted to the gear train 18 by motor 16 is illustrated in FIGS. 4 and 5 A-C. Said assembly is carried from the mounts 22 on an insulating board 50. The assembly comprises a pair of contacts 52 and 53 carried by a pair of metal brackets 54 mounted in laterally spaced relationship on board 50. A second pair of laterally spaced contacts 55 and 56 are mounted on board 50 in vertical alignment with contacts 52 and 53, respectively. The contacts 52 and 56 are connected in series by a wire 58 connected to one side of the rectifier 20. The contacts 53 and 55 are connected in series by a wire 59 connected to the opposite side of the rectifier 20.

A pair of laterally spaced conductive hangers 61 and 62 are also mounted on board 50 in longitudinal alignment with, and rearwardly of, the contacts 52, 53, 55 and 56. Hanger 61 is connected by wire 63 to one side of the motor 16, and hanger 62 is connected by wire 64 to the opposite side of said motor.

The hangers 61 and 62 project downwardly from board 50 and each is provided adjacent its lower end with a slot 65. A pair of switch arms 68 and 69 identical in their construction are swingably mounted in the slots 65. As shown, each of said arms is provided at its rearward end with an angularly offset finger 70 and at its forward end with an upturned toe 72. A pair of switch blades 74 and 75 identical in their construction are also mounted on the hangers 61 and 62 and project forwardly therefrom. Each of the blades 74 and 75 has a contact 78 on its upper face and a contact 79 on its lower face. As shown, blades 74 and 75 have a length such that their contacts 78 are closable against contacts 55 and 56, and contacts 79 are closable against contacts 52 and 56. Blades 74 and 75 are adapted to snap-over center, and both are oriented to urge their contacts 78 to close against contacts 55 and 56.

Each of blades 74 and 75 has a finger 82 formed thereon to which one end of a coil spring 84 is connected. The springs 84 project rearwardly through openings 86 in hangers 61 and 62 and are connected to the switch arms 68 and 69 and thus urge said arms to swing in a clockwise direction as viewed in FIG. 4.

Figure 6:
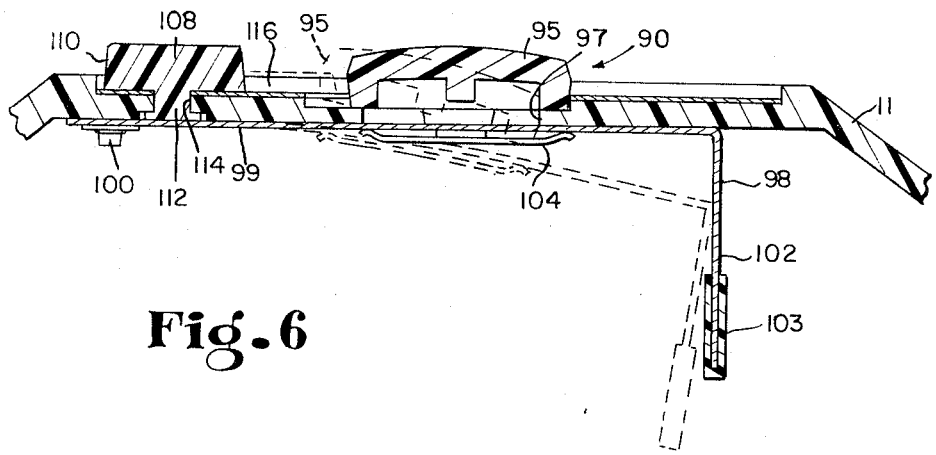
FIG. 6 is an enlarged fragmentary vertical section taken on the line 6—6 of FIG. 1.
Figure 7:
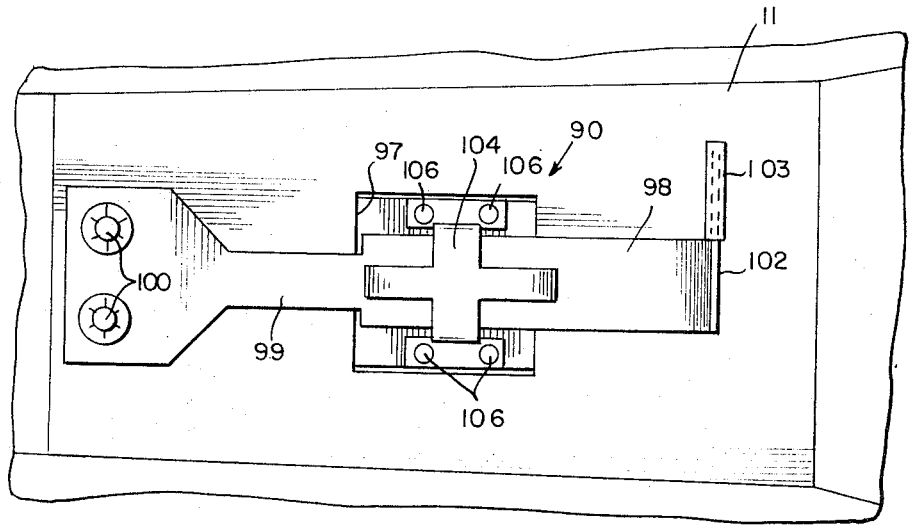
FIG. 7 is a bottom plan view of the switch shown in FIG. 6.
Figure 8:
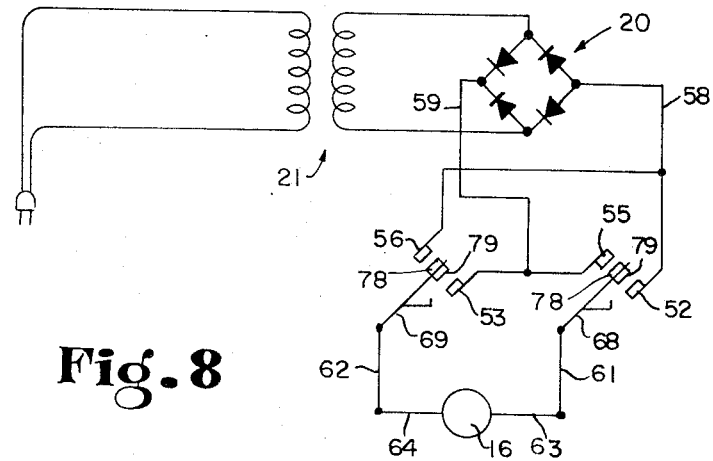
FIG. 8 is a wiring diagram of the circuitry for the shears shown in FIG. 1.

During the operation sequence of the shears, the switch arms 68 and 69 are moved to effect the proper contact closing by a switch assembly 90 mounted on the housing shell 11 and by a cam 92 mounted on shaft 25 for rotation therewith. As shown in FIGS. 6 and 7, the switch assembly 90 comprises a manually manipulatable button 95 projecting upwardly through an opening 97 in shell 11. The button 95 is slidably carried on an upwardly biased, L-shaped leaf spring 98 mounted on the inner face of shell 11. As shown in FIG. 7, spring 98 comprises a first leg 99 which at its rearward end is fixedly connected, as by a pair of studs 100, to said shell. The opposite or forward end of leg 99 terminates in a laterally offset downwardly extending leg 102. The leg 102 is disposed in vertical alignment with the fingers 70 on switch arms 68 and 69, and a cap 103 formed of insulating material is mounted on the lower end of said leg for engagement with said fingers.

In order to slidably mount the button 95 on spring leg 99, a yoke 104 extends across the lower face of said leg and has its ends connected, as by studs 106, to the lower face of said button. As shown in full lines in FIG. 6, he button 95 is slidable forwardly on leg 99 so that its forward end overlies the adjacent edge of the shell opening 97. With the button in this position, it is not possible to depress said button for activating the shears. Conveniently, the button is releasably locked in this non-operative position by a lock 108. As shown in FIG. 6, the lock 108 comprises a knurled finger grip 110 integral with a downwardly projecting shank 112 rotatably carried in an opening 114 in shell 11. A tongue 116 projects radially from the finger grip 110, and is of a length such that upon rotation of the lock to bring the tongue into alignment with the button 95 it engages the adjacent or rearward end of said button. This prevents said button from being slid rearwardly on spring leg 99 so that it can be depressed for activating the shears. Rotation of the grip 110 to dispose the tongue 116 out of the path of the sliding movement of button 95 permits said button to be slid rearwardly on leg 99 so that it can be depressed into its actuated position as shown in dotted lines in FIG. 6.

The springs 84 urge the arms 68 and 69 in a clockwise direction as viewed in FIG. 4. However, depression of the button 95 as just described causes the cap 103 on the spring 98 to engage the fingers 70 of switch arms 68 and 69 to effect a counter-clockwise movement of said switch arms. Movement of the switch arms is also controlled by the springs 84 acting in combination with the cam 92 on shaft 25. As shown in FIG. 4, said cam is mounted on the shaft in vertical alignment with the switch arm toe 72. Said cam comprises an arcuate segment of a cylinder. One edge 120 of said cam lies on the chord of the circle defined by the outer circumferential face 121 of said cam. The opposite edge of said can, however, is stepped. Said opposite edge is thus provided with a first cam face 122 disposed in alignment with switch arm 68, and a second cam face 123 disposed in alignment with switch arm 69. As shown, the cam faces 122 and 123 are disposed on different chords of the circle defined by the outer circumferential face 121 whereby they will effect with the springs 84 different movements of the switch arms 68 and 69.

As will be more fully described hereinafter, when the thumb button 95 is in open or retracted position, the cap 103 on spring 98 is disposed out of engagement with the switch arms 68 and 69, and said arms will be urged to swing in a clockwise direction (as viewed in FIG. 4) under the action of springs 84. The toes of arms 68 and 69 will, however, depending upon the orientation of the cam 92 at the time of button release, engage the cam face 121 or the faces 122 and 123 to effect the desired contact closing.

In the operation of the shears, the lock 108 is rotated to its unlock position, and the button 95 is slid rearwardly and downwardly. This causes the cap 103 on spring 98 to bear against the fingers 70 on switch arms 68 and 69 to swing their toes 72 out of engagement with the cam 92. Such swinging movement disposes the connection between the springs 84 and the arms 68 and 69 below the connections of the blades 74 and 75 to the hangers 61 and 62 so that the blades 74 and 75 snap downwardly to close the blade contacts 79 against contacts 52 and 53. With this combination of contacts closed, as shown in FIG. 5-A, the circuit will be closed through wires 61–64 to the motor 16 to actuate said motor to drive the gear train 18 in the first or forward direction. This rotates the gear train output driver gear 29 to drive gear 27 so that its stud 42 will effect a reciprocating swinging movement of blade 35 to thereby effect cutting. This reciprocating movement of blade 35 will continue in this manner until the pressure is released from the button 95 to thus disengage the cap 103 from the arms 68 and 69.

When cap 103 is moved out of engagement with the arms 68 and 69, the toes 72 on said arms will be swung in a clockwise direction under the influence of spring 84 as viewed in FIG. 4 to engage the arcuate cam face 121 on cam 92. This disposes the connections of springs 84 to arms 68 and 69 above the connections of the blades 74 and 75 to the hangers 61 and 62 so that said blades will snap upwardly to close their contacts 78 against contacts 55 and 56, as shown in FIGS. 5-B. Again, a circuit is completed through wires 61–64 to motor 16. However, this contact relationship causes a reversal in the polarity of circuit supplied to the motor such that the gear train 18 is driven in a reverse or opposite direction. The arcuate extent of the cam face 121, however, only permits this contact relationship to exist for a time sufficient that the reverse driving of the gear train will cause the blade 35 to be swung upwardly so that its cutting edge 44 is disposed in spaced relationship to the cutting edge 45 on blade 34. Thus, the cutting blades will be in an open position.

When this condition has been reached, the cam 92 will have been rotated to bring the cam faces 122 and 123 into engagement with the toes 72 on arms 68 and 69. Upon the toes 72 coming into contact with cam faces 122 and 123, face 123 will cause arm 69 to swing in a counter-clockwise direction with respect to arm 68. This movement of arm 69 causes the spring 84 on blade 75 to snap said blade downwardly thereby closing its contact 79 against contact 53. Since can face 122 supports arm 68 against such swinging movement, contact 78 on blade 74 will remain closed against contact 55. This contact relationship as shown in FIG. 5-C, prevents a closing of the circuit through wires 61–64 to the motor 16 to thus deactuate said motor.

Should the button 95 be released when the blades 34 and 35 are in their open position, it will not be necessary to reverse the drive of the motor 16. And in such an instance, the toes 72 will be in alignment with the cam faces 122 and 123. With the button 95 released, the arm 69 will be swung in a clockwise direction as viewed in FIG. 4 by the cam face 123 thereby causing its associated blade 75 to snap downwardly to close its contact 79 against contact 53. Cam face 122 permits arm 68 to remain oriented in position such that its blade 74 retains its contact 78 closed against contact 55. Again, with the blades 74 and 75 in this orientation, as shown in FIG. 5-C, the circuit to the motor 16 will be open to deactuate said motor.

As will be seen, the inter-relationship between the various contacts of the switching members permits the shears to be operated in a manner such that the blades will provide a continuous uninterrupted cutting action as long as the thumb button 95 is depressed. Once the pressure on button 95 is released, however, the cam 92 will cause the switching assembly to operate in a sequential manner such that the driving direction of motor 16 is reversed to open blade 35 with respect to blade 34 and to stop the actuation of said motor when this blade orientation is achieved. In other words, when it is desired to terminate the cutting action, blade 35 will be stopped and reversed to its open position. As will be appreciated, this prevents a person from having a finger accidentally disposed between the blades with the blades locked in a closed position. Further, by the exercise of simple manual dexterity, it is possible to achieve an extremely short cutting stroke with blade 35 to thus permit the blades to achieve a sharp angled cut.

While the instant invention has been described as being embodied in a pair of pinking shears, it is to be understood, of course, that any desired type or configuration of cutting blades may be employed in the device.

I claim:

1. In an electric shears, a housing, a reversable electric motor mounted in said housing, a plurality of first contacts adapted to be connected to a power source, a gear train mounted in said housing and connected to said motor, a fixed and a movable blade swingably interconnected to each other and projecting outwardly from said housing, a shaft carried within said housing, a gear mounted on said shaft and interconnected to said gear train and movable blade for rotating said shaft and moving said movable blade, a cam carried on said shaft for rotation therewith, a pair of switch arms swingably supported within said housing, a pair of second contacts operatively connected to said switch arms and said motor, a manually manipulatable switch mounted on said housing and engageable with said switch arms to move said arms to cause said second contacts to close against a pair of said plurality of first contacts to actuate said motor to drive said gear train in a first direction, and means on said can engageable with said switch arms when said switch is out of engagement therewith to move said arms to cause said second contacts to sequentially close against a second pair of said plurality of first contacts to actuate said motor to drive said gear train in a second direction and against a third pair of said plurality of first contacts to deactuate said motor.

2. An electric shears as set forth in claim 1 with the addition that said gear train is carried in a casing mounted in said housing, a pair of mounts projecting outwardly from said casing, and said shaft is rotatably supported in said mounts.

3. An electric shears as set forth in claim 1 with the addition that said gear train is carried in a casing mounted in said housing, first and second pairs of mounts project outwardly from said casing at one end thereof, and said shaft is rotatably supported on said first pair of mounts and said switch arms are swingably supported from said second pair of mounts.

4. An electric shears as set forth in claim 1 with the addition that said gear train is carried in a casing mounted in said housing, first and second pairs of vertically spaced mounts project outwardly from said casing at one end thereof, said shaft is rotatably supported on said first pair of mounts and said switch arms are swingably supported in laterally spaced relation from said second pair of mounts, and said cam is mounted on said shaft in alignment with said arms.

5. An electric shears as set forth in claim 4 with the addition that said cam has a pair of laterally spaced cam faces each disposed in alignment with one of said switch arms for moving said arms with respect to each other.

6. An electric shears as set forth in claim 1 in which said manually manipulatable switch comprises an L-shaped spring having a first leg connected to said housing and a second leg engageable with said switch arms, and a button carried on said first leg and received in an opening in said housing.

7. An electric shears as set forth in claim 6 in which said button is slidably mounted on said first leg, said button being movable into a position to engage said housing adjacent said opening to prevent said button from moving said spring.

8. An electric shears as set forth in claim 1 in which said manually manipulatable switch comprises an L-shaped spring having a first leg connected to said housing and a second leg engageable with said switch arms, a button slidably carried on said first leg and received in an opening in said housing, said button being movable into a position to engage said housing adjacent said opening to prevent said button from moving said spring, and means on said housing to prevent said button from sliding.

9. An electric shears as set forth in claim 8 in which said means on said housing comprises a rock rotatably mounted on said housing and having a radially projecting tongue movable into and out of the path of movement of said button.

10. In an electric shears, a housing, a fixed and a movable blade swingably interconnected and projecting outwardly from said housing; a reversable electric motor mounted in said housing; first, second, third and fourth electrical contacts adapted to be connected to a power source; a gear train interconnected to said motor and movable blade for moving said movable blade; first and second switch arms having fifth and sixth contacts operatively associated therewith and connected to said motor; said fifth and sixth contacts being movable between a first position in which they are closed respectively against said first and second contacts for actuating said motor to drive said gear train in one direction and a second position in which they are closed respectively against said third and fourth contacts for actuating said motor to drive said gear train in an opposite direction and a third position in which they are closed respectively against said first and fourth contacts for deactuating said motor; first means for moving said switch arms to cause said fifth and sixth contacts to move into said first position; and second means for moving said switch arms to cause said fifth and sixth contacts to move successively into said second and third positions.

11. An electric shears as set forth in claim 10 in which said first and third contacts and said second and fourth contacts are wired in series.

12. An electric shears as set forth in claim 10 in which said first and third contacts and said second and fourth contacts are wired in series, a rectifier has one of its sides connected to said first and third contacts and its opposite side connected to said second and fourth contacts, and a transformer is connected to said rectifier.

13. An electric shears as set forth in claim 10 in which said fifth and sixth contacts are mounted on a pair of movable switch blades, and a spring is interconnected to each of said switch blades to one of said switch arms.

14. In an electric shears, a housing, a fixed and a movable blade swingably interconnected to each other and projecting outwardly from said housing, a reversable electric motor, a plurality of first contacts adapted to be connected to a power source, a gear train interconnected to said motor and movable blade for moving said blade, a pair of switch arms, a pair of second contacts operatively connected to said switch arms and connected to said motor, means engageable with said switch arms to move said switch arms to cause said second contacts to selectively open and close against said first contacts to selectively actuate said motor to drive said gear train in a first direction in a continuous manner and to drive said gear train through a predetermined interval in an opposite direction.

15. In an electric shears, a housing, a fixed and a movable blade swingably interconnected and projecting outwardly from said housing; a reversable electric motor mounted in said housing; gear means interconnected to said motor and movable blade for moving said blade upon actuation of said motor; switch means connected to said motor and a power source and movable into a first position for actuating said motor to drive said gear means in a first direction, a second position for actuating said motor to drive said gear means in a second direction, and a third position for deactuating said motor; and means for actuating said switch means to cause said switch means to move into said first, second and third positions.

16. An electric shears as set forth in claim 15 in which said means for actuating said switch means includes means for successively moving said switch means from said first through said third positions.

17. In an electric shears, a housing, a fixed and a movable blade swingably interconnected and projecting outwardly from said housing, an electric motor mounted in said housing, a gear train carried in a casing mounted in said housing, said gear train being connected to said motor and having a driver gear, a shaft carried from said casing, a driven gear mounted on said shaft in mesh with said driver gear, an eccentrically mounted stud on said driven gear rotatably and slidably carried in a slot formed in said movable blade for moving said blade with respect to said fixed blade, a plurality of contacts interconnected between said motor and a power source, a leaf spring mounted in said housing, and a switch button mounted on said spring for moving said spring into a position to close said contacts for actuating said motor, said button being slidably mounted on said spring for movement to and from an inoperative position overlying said housing whereby said button is prevented from moving said spring.

18. An electric shears as set forth in claim 17 with the addition that a lock is mounted on said housing for engagement with said button to releasably lock said button in its inoperative position.

19. In an electric shears, a housing, a fixed and a movable blade swingably interconnected and projecting outwardly from said housing, a reversable electric motor mounted in said housing, a gear train carried in a casing mounted in said housing, said casing having pairs of vertically spaced mounts projecting therefrom, a shaft carried on one of said pairs of mounts, a cam mounted on said shaft for rotation therewith, a bevel gear mounted on said shaft, said gear drivingly interconnecting said gear train to said movable blade and shaft, an insulating board carried on the other of said pairs of mounts, a first set of contacts mounted on said board, a rectifier connected to a transformer and to said first set of contacts, a pair of electrically conductive hangers mounted on said board and connected to said motor, a pair of switch arms swingably mounted on said hangers and engageable with said cam, a pair of switch blades mounted on said hangers and having a second set of contacts closable against said first set of contacts, spring means interconnecting said switch blades and arms, and a manually manipulatable switch mounted on said housing engageable with said switch arms, said switch and cam being selectively engageable with said switch arms for moving said switch arms to cause said switch blades to move said second set of contacts to selectively close against said first set of contacts to successively actuate said motor to drive said gear train in a first direction, an opposite direction and to deactuate said motor.

* * * * *